(12) United States Patent  
Batterman et al.

(10) Patent No.: US 6,223,988 B1
(45) Date of Patent: May 1, 2001

(54) HAND-HELD BAR CODE READER WITH LASER SCANNING AND 2D IMAGE CAPTURE

(75) Inventors: Eric P Batterman, Flemington; Donald G Chandler, Princeton, both of NJ (US)

(73) Assignee: Omniplanar, Inc, Princeton, NJ (US)

( * ) Notice: Subject to any disclaimer, the term of this patent is extended or adjusted under 35 U.S.C. 154(b) by 0 days.

(21) Appl. No.: 09/284,395

(22) PCT Filed: Oct. 14, 1997

(86) PCT No.: PCT/US97/18492

§ 371 Date: Apr. 13, 1999

§ 102(e) Date: Apr. 13, 1999

(87) PCT Pub. No.: WO98/16896

PCT Pub. Date: Apr. 23, 1998

Related U.S. Application Data

(60) Provisional application No. 60/028,592, filed on Oct. 16, 1996.

(51) Int. Cl.$^7$ .................................................. G06K 7/10
(52) U.S. Cl. ................................. 235/472.01; 235/462.1
(58) Field of Search ............................ 235/472.01, 462.1

(56) References Cited

U.S. PATENT DOCUMENTS

| | | | |
|---|---|---|---|
| 5,378,883 | * | 1/1995 | Batterman ................ 235/472.01 |
| 5,621,203 | * | 4/1997 | Swartz ...................... 235/462.01 |
| 5,672,858 | * | 9/1997 | Li et al. .................... 235/462.01 |
| 5,710,417 | * | 1/1998 | Joseph et al. ............. 235/462.01 |

* cited by examiner

*Primary Examiner*—Harold I. Pitts
(74) *Attorney, Agent, or Firm*—Allan Jacobson

(57) ABSTRACT

A hand-held bar code reader includes a laser scanning module and a two dimensional image sensor and processing for reading a bar code. The laser scanner assists the 2D image processing by providing information on location, type, range, reflectivity, and presence of bar code for 2D reading. Additionally, the 2D imaging reading operation is improved by using the laser scan as a spotter beam for aiming.

41 Claims, 6 Drawing Sheets

HAND-HELD BAR CODE READER WITH LASER SCANNING AND 2D IMAGE CAPTURE

Applicants hereby claim the benefit of priority of international paten application, PCT/US9718492, filed Oct. 14, 1997, and U.S. provisional patent application, 60/028,592, filed Oct. 16, 1996.

FIELD OF THE INVENTION

The invention relates to an improved method and apparatus for reading bar codes and the like with a hand-held reader.

BACKGROUND OF THE INVENTION

Various types of hand-held bar code readers have been developed for many applications. These include wands, fixed beam, moving beam, linear CCD (charge coupled device), and two dimensional CCD readers. All examples of the prior art hand held bar code readers suffer from a variety of drawbacks.

Wands, fixed beam, and moving beam readers all operate using the same basic principal. Typically, a small spot of light is directed from a source of illumination to the surface of the bar code and is swept across the entire length of the bar code (i.e. a scan line). The intensity of the reflected light from the beam is modulated by the bar code pattern. The reflected light is gathered by optics and focused on an optical detector which converts light intensity to an analog electrical signal. The analog signal is then thresholded to a binary value of zero, representing the black bars or one, representing the white spaces.

Moving beam readers direct an LED or laser beam in a repetitive linear (i.e. one-dimensional) scanning pattern using rotating or vibrating mirrors and lenses. These readers eliminate the need for manual scanning or sweeping of the code. A moving beam reader typically scans at about 40 scans per second, allowing multiple tries on a bar code. Multiple scans provides a better chance to get a valid read on a bar code with minimal damage, however the readers must get a complete valid scan (i.e. cut through all of the bars in one sweep) in order to decode a bar code. Typical operating range of moving beam readers is about one foot. Moving beam readers will not read damaged, poorly printed, height modulated, or true two dimensional codes.

Another type of moving beam scanner is known as a raster laser scanner. The raster scan is produced by modulating the beam in the vertical direction in addition to the traditional horizontal linear scan described above. The main reason for this raster scan is to enable reading of stacked codes such as Symbol Technologies' PDF417. However, even these raster scan readers still suffer from many of the same drawbacks of the previously described hand-held readers, namely the need for orienting the reader with the bar code (non-omnidirectionality), difficulty reading damaged or poorly printed codes, and the inability to read true two dimensional bar codes.

Linear CCD readers eliminate the need for mechanically sweeping a beam across bar codes, but require a bright source of illumination. Linear CCD readers capture a one dimensional image of the bar code and read out the information as an electrical signal which is similar to the output of wand, fixed, or moving beam readers. Linear CCD readers typically have an extremely small depth of field of and are usually limited to reading bar codes shorter than the width of the CCD reader head (typically less than 3 inches). Linear CCD readers will not read damaged, poorly printed, height modulated, or true two dimensional codes.

Two dimensional (2D) CCD readers capture and process a two dimensional image of a bar code. These readers are capable of omnidirectionally reading conventional, damaged, multiple, height modulated, or stacked bar codes symbols along with true two dimensional codes (MaxiCode, PDF417, DataMatrix, etc.). However, 2D CCD readers do not perform well over long ranges, and require a separate means for aiming. Economical 2D CCD readers have a limited number of pixels forcing a tradeoff between sample density and coverage width. High sample density is required to read bar codes with very small module size. As sample density increases, coverage width decreases, reducing the maximum length bar code that can be read. Therefore a compromise must be made between sample density and coverage width. Moving beam readers do not suffer from this drawback.

SUMMARY OF THE INVENTION

The present invention is embodied in a hand-held bar code reader which combines a laser scanning module with a two dimensional image sensor and processing for reading a bar code. The reader in accordance with the current invention provides complete backward compatibility with traditional laser scanners along with the two dimensional (2D) imaging capabilities of omnidirectionally reading conventional, damaged, multiple, height modulated, or stacked bar code symbols along with true two dimensional codes (Maxicode, PDF417, DataMatrix, etc.). The present invention combines the prior art technologies of laser scanning and 2D imaging in a novel fashion that provides numerous benefits. The 2D imaging reading operation is improved by using the laser scan as a spotter beam for aiming. Additionally, the laser scanner can assist the 2D image processing by providing information on location, type, range, reflectivity, and presence of bar code for 2D reading. The majority of the electronic components of the reader are synergistically shared between the laser scanner and the 2D imaging including processor, RAM and ROM memories.

DETAILED DESCRIPTION

Figure 1:
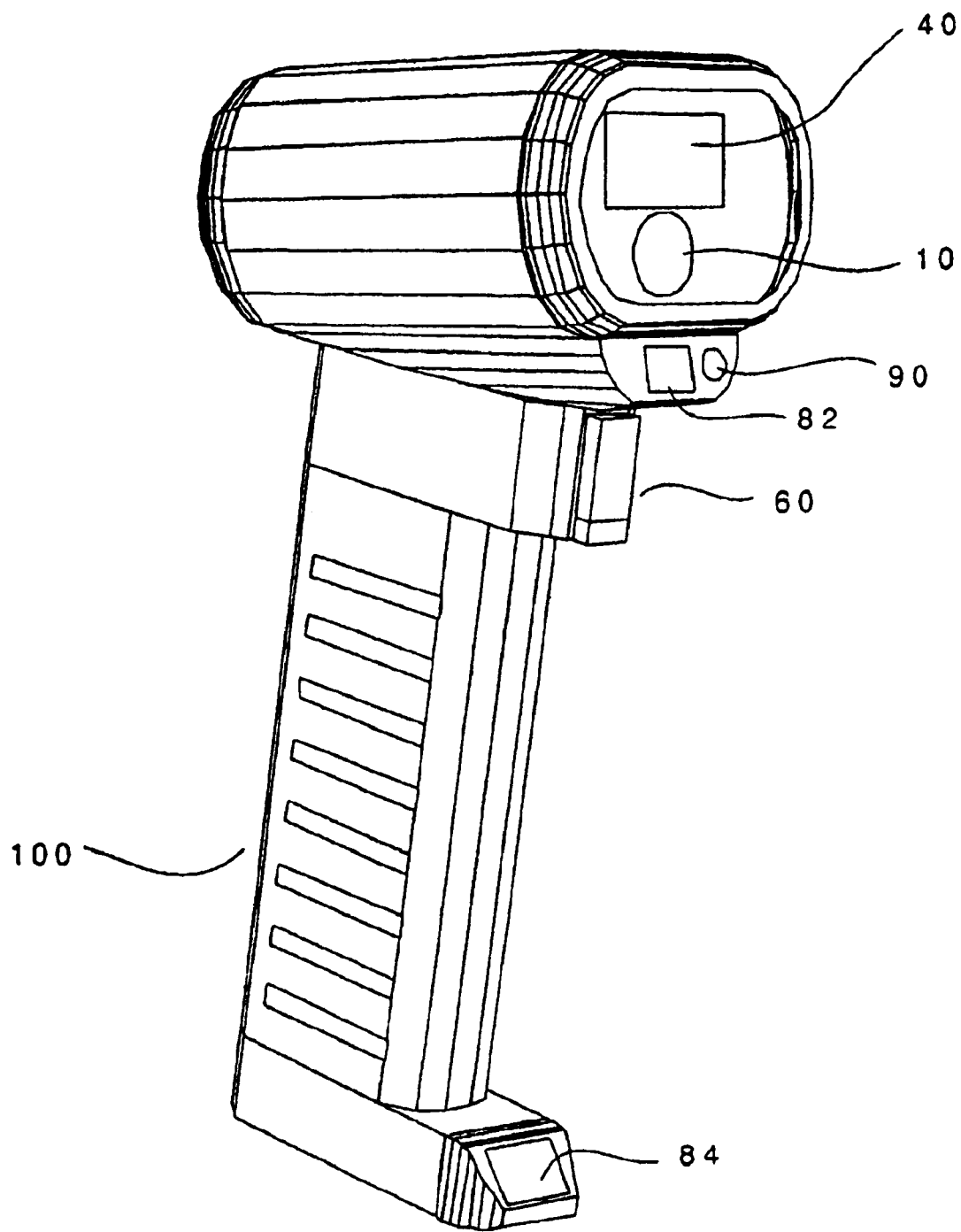
FIG. 1 is a view illustrating a bar code reader in accordance with the present invention.
Figure 2:
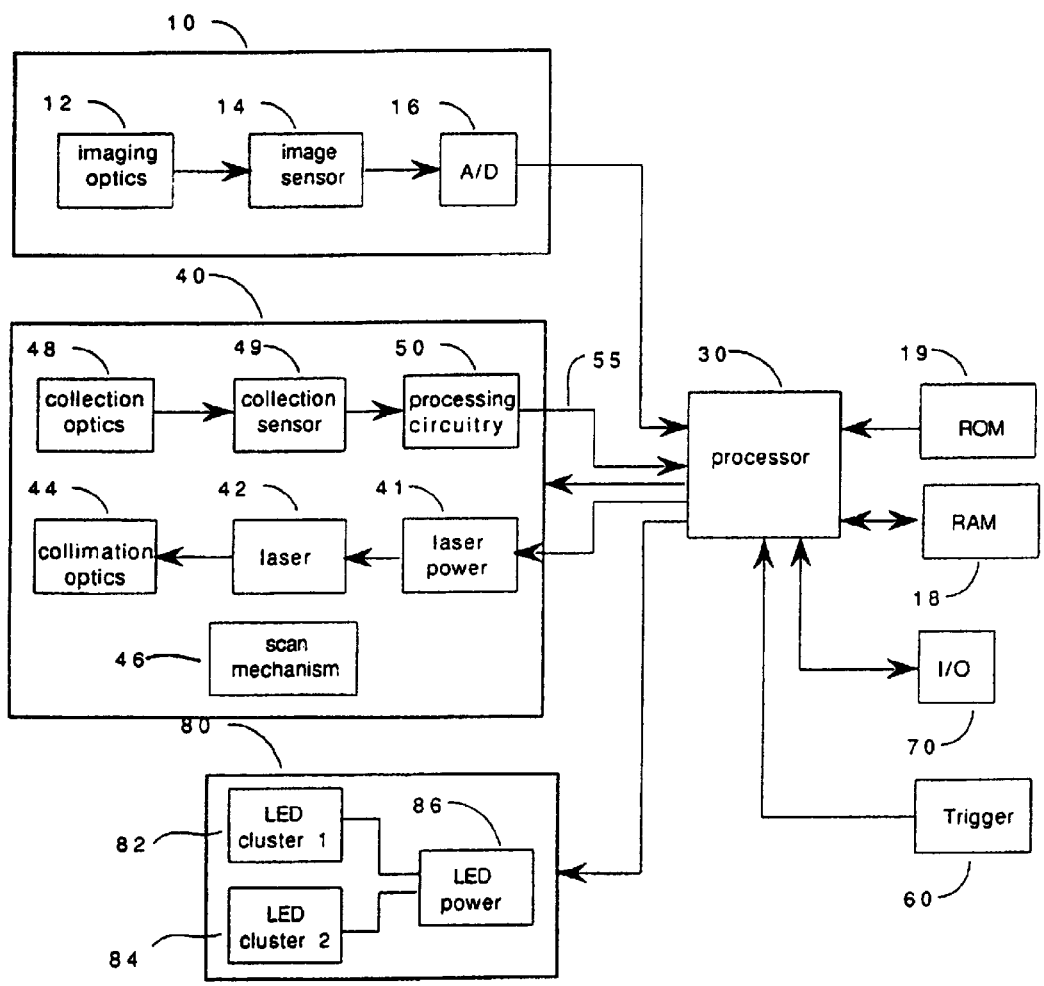
FIG. 2 is a block diagram of a bar code reader in accordance with the present invention.

A bar code reader in accordance with the present invention is shown in FIGS. 1 and 2. The bar code reader is a combination of a traditional laser scanning reader with a 2D imaging reader. The reader can read bar codes with the laser and/or with 2D image capture and processing. The 2D imaging reading operation is improved by using the laser scan as a spotter beam for aiming. Additionally, the laser scanner can assist the 2D image processing by providing information on location, type, range, reflectivity, and presence of bar code for 2D reading. The reader in accordance with the current invention provides complete backward compatibility with traditional laser scanners along with the 2D imaging capabilities of omnidirectionally reading conventional, damaged, multiple, height modulated, or stacked bar code symbols along with true two dimensional codes (MaxiCode, PDF417, DataMatrix, etc.). The majority of the electronic components of the reader are synergistically shared between the laser scanner and the 2D imaging including processor, RAM and ROM memories. Additionally, the processing power required to process the laser scan lines is significantly less than the amount of processing required to process a 2D image.

Operational Modes

A bar code reader with both laser scanning and 2D imaging capabilities provides for a wide range of operating modes. The operating mode of the reader is chosen based on factors including the type and quality of bar codes to be read, ambient conditions, and user skill.

The first mode or "alternating" mode is when the reader alternates between reading with the laser and the 2D imager until the bar code(s) of interest are read. Alternating mode is the preferred default operating mode of the reader, and provides good performance in situations where the reader is used with no a priori knowledge as to what type of bar codes are to be read.

The second mode or "known" mode—is when the most likely method of successful scanning, laser, 2D, or a combination of laser and 2D is known before the reading process begins. This knowledge can be entered into the reader via I/O port 70, or could be automatically "learned" by the reader keeping statistics as to what types of bar codes are usually encountered and the ways they are read most successfully.

The third mode is the laser priority mode, where the reader attempts to use the laser scanner at a higher priority than the 2D image scanner. This mode would typically be used when the bar codes of interest are usually linear, are physically very long (and would therefore not be completely contained within the field of view of the 2D imager), have very small module sizes, and/or where the bar codes are at very long ranges.

The fourth mode is 2D priority mode, where the reader attempts to use the 2D imager at a higher priority than the laser scanner. This mode would typically be used where the bar codes of interest are typically true two dimensional codes, or damaged, multiple, height modulated, or stacked bar codes symbols. Additionally, this mode is useful when omnidirectional reading of linear codes is desired.

Another mode is laser only mode, where 2D imaging is never used. This mode is used to conserve power. Another mode, 2D only mode, is where the laser is never used. The 2D only mode is useful for situations when no laser readable bar codes are expected. A bar code reader with a laser scanner and 2D imaging capabilities provides for a wide range of operating modes.

A 2D imaging module 10 consists of imaging optics 12 coupled to image sensor 14 as shown in FIG. 2. The output of image sensor 14 is converted from analog to digital in A/D converter 16 and stored in memory 18 by processor 30. Memory 18 may be a RAM memory such as SRAM, DRAM, or any other type of read/write memory. Illumination is provided by illumination module 80 by LEDs in cluster 82 and cluster 84 under the control of processor 30. The appropriate power for the LEDs is provided by power control 86 responsive to processor 30. Bar code decoding, and overall reader control is provided by processor 30.

Laser scanning is provided by laser scan module 40. This module consists of laser 42, laser power control 41, collimation optics 44, scanning mechanism 46, collection optics 48, collection sensor 49, and processing circuitry 50. The output of processing circuitry 50 may also be stored in RAM 18. Trigger 60 activates the reading process. The decoded bar code information is output to an external device by I/O port 70. Additionally, I/O port 70 can be used to supply power to the hand-held reader.

Processor 30 is typically a high speed microprocessor such as the ARM, PowerPC, Hitachi SH series, MIPS R3000 or R4000, TI320Cx series or the like. The memory for processor 30 is both non-volatile memory 19 for storing programs, configuration parameters, etc. (examples include: ROM, flash ROM), and read/write memory 18 for image processing storage/scratch pad. The output of reader 100 is decoded bar code information.

Operation

Figure 3:
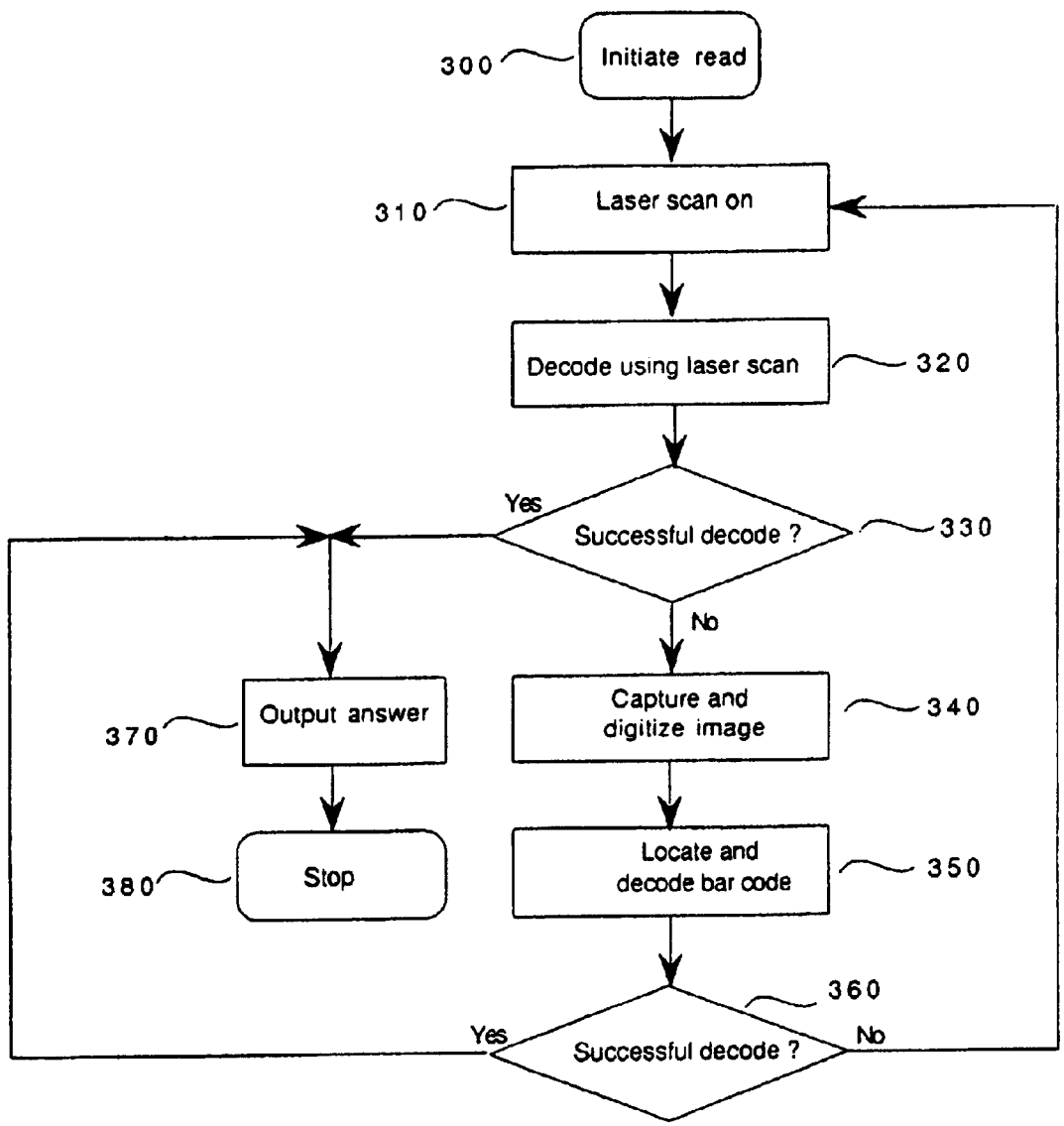
FIG. 3 is a flow chart illustrating operation of the bar code reader in accordance with the present invention.

In operation, a bar code read operation is triggered in various fashions including manual, automatic, or continuously. A bar code read operation is initiated in step 300 in FIG. 3. Processor 30 responds in various fashions depending on the mode of bar code operation desired. Since the bar code reader has the ability to read bar codes with the laser scanner or with 2D image capture and processing, the operational modes are preferably optimized to reduce total read time and to increase overall read rate. The total read time includes the time it takes the operator to correctly position the reader in relationship to the bar code along with the actual time it takes to laser scan or capture an image and process the bar code.

In alternating mode, a bar code read is initiated (step 300) by trigger 60 as an input signal to processor 30. Laser scan module 40 is activated at step 310, producing a laser scan line. This line is used simultaneously by the operator as a spotter beam for aiming the reader, and by the reader to decode any bar code the scan line scans. Reflected light from the laser scan line is collected by collection optics 48, collection sensor 49, and processing circuitry 50 (FIG. 2). Electrical signal 55 produced by processing circuitry 50 is processed by processor 30 to decode any bar code that is scanned at step 320. Signal 55 may be stored in memory 18 in various ways including direct processor control, using DMA, or by dedicated circuitry. If the scan line is used successfully to read a bar code (step 330), the read is complete and scan module 40 is turned off. The decoded bar code information is output to an external device by I/O port 70 at step 370 and the system may stop 380 after a successful read.

Processing circuitry 50 may include waveshaping, thresholding and other circuitry that is well known in the art of laser bar code scanners. Additionally, electrical signal 55 may be digitized to more than one bit, (i.e. gray scale) enabling more sophisticated processing. Most prior art laser scanners threshold received scan lines to binary (i.e. black or white) prior to decoding due to their limited processor capability. However, the current invention already has the processing power required to decode a gray scale 2 dimensional image, enabling sophisticated processing of a one dimensional laser gray scale signal 55. Additionally, A/D converter 16 could be used to digitize signal 55.

If, after a predetermined amount of time or number of laser scans have occurred and a bar code has not been successfully read at step 330, the laser is shut off, and a 2 dimensional image is captured at step 340. The captured image is read out of image sensor 14, digitized by A/D converter 16, and stored in image memory 18 at step 340. The image can be stored memory 18 in various ways including direct processor control, using DMA, or by dedicated circuitry. The reader now has a digitized image of its field of view, which may contain a bar code label, stored in image memory 18. Processor 30 executes stored programs to locate and decode the bar code at step 350. If the decode was successful 360, the decoded bar code information is output to an external device by I/O port 70 at step 370 and the system may stop at step 380.

The laser scanner may detect the presence, type, and location of bar codes, areas of activity, or other information during the processing of signal 55. If a bar code was not successfully read at step 330, this information may be used to assist the 2D image processing.

Additionally, the processing of the captured image may be interrupted on a regular basis to process new laser scan lines. The reader may overlap or time share the processing of laser scan lines with 2D images. The amount of time required to process a laser scan line is very small compared to the time required to process a 2D image. These new scan lines are useful to both aim the reader (especially useful if the first image capture and processing fails) and to decode any bar code that the line scans.

Since the operator typically attempts to center the bar code in the field of view of the reader, it is also useful to provide operating modes where the processing of the 2D image concentrates on the center of the image. The algorithms can start in the center and work outward to save processing time (assuming the bar code is near centered). Additionally, if there are multiple bar codes in the field of view, the reader can place emphasis on the bar codes closest to the center by issuing them first, suppressing non-centered bar codes, or other variants of operation based on the position of bar codes in the field of view.

If no bar code was located/decoded at steps 350 and 360, the reader may repeat the entire process as long as the trigger is still activated by returning to step 310. If a bar code was decoded at step 350, the reader may then deactivate.

Beam Width

Figure 4A:
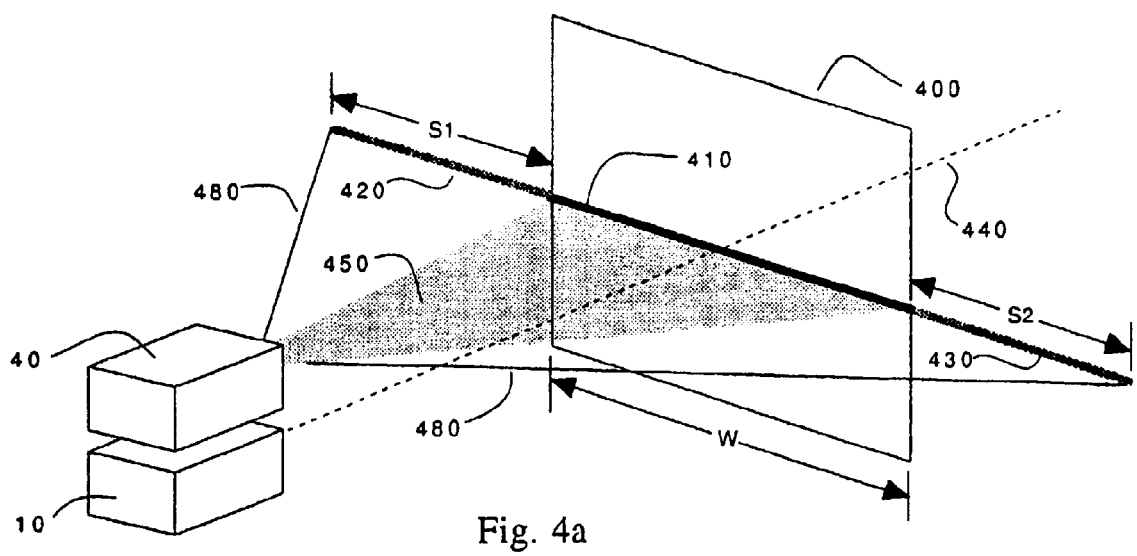
FIG. 4a is a three dimensional illustration of the placement of the laser beam and its scan width with respect to the imaging optics and field of view in accordance with the present invention.

Since the laser scan line is used by the operator to aim the reader, it is desirable at times to limit the width of the scan line to the width of the field of view of the 2D imager. This gives the operator the ability to aim the reader at a bar code and center the bar code within the field of view. FIG. 4*a* shows field of view 400 of 2D imaging module 10 and laser scan line 410 limited to width W. Additionally, it is preferable to have the width of the laser scan line be adjustable to the approximate horizontal width W of field of view 400 when used for aiming, and to a long width for reading bar codes. This long width is shown by scan segments 410, 420, and 430 (for a total width of W+S1+S2). Adjustable scan width is accomplished in various ways. In a resonant laser scanner such as DI-1000 by PSC Inc., scanning mechanism 46 includes a resonant structure which is energized by appropriately timed electromagnetic pulses. The preferred method of limiting the scan width with a resonant scanner is to cycle the laser on and off using laser power control 41 while scan mechanism 46 remains on continuously. The full laser sweep is shown by lines 480. The laser is turned off outside the field of view (segments 420 and 430). The laser is turned on within the field of view (segment 410).

The correct timing for turning the laser on and off can be determined automatically by capturing and processing images of the laser scan line with the 2D imager. The timing is iteratively adjusted and analyzed until the scan line is the appropriate width. In a preferred method, first, the laser beam is turned off well short of the edge of each side of the field of view. The laser turn on time would be gradually increased (analyzing an image with each increase) until the appropriate width was achieved. These timing parameters would be determined during manufacturing or recalibration and be stored for future use. Additionally, these parameters may be automatically re-calibrated after a predetermined number of reads or period of time has elapsed.

Other types of laser scanners use a scan mechanism comprised of controllable mirrors (driven by galvanometers, stepper motors, etc.). In these types of scanners, the laser can be left on continuously, and the scan width is controlled by adjusting the travel of the scan mirror. The scan width parameters (in this case mirror movement) can also be determined using the captured images of the laser scan as described above. Additionally, in various types of laser scanners it is also possible to stop the laser from scanning. This can be used as a stationary spotter beam for aiming the reader.

It is desirable in certain situations to limit the scan line to less than the field of view to assist in aiming the reader. This can help the operator center bar codes in the field of view. Additionally, limiting the scan width can reduce manufacturing and calibration tolerances.

Figure 4B:
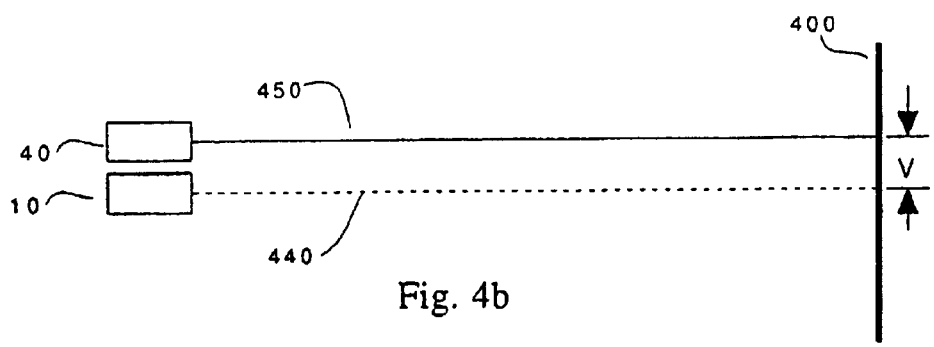
FIG. 4b illustrates vertical displacement of the laser beam with respect to the imaging optics and field of view in accordance with the present invention.
Figure 4C:
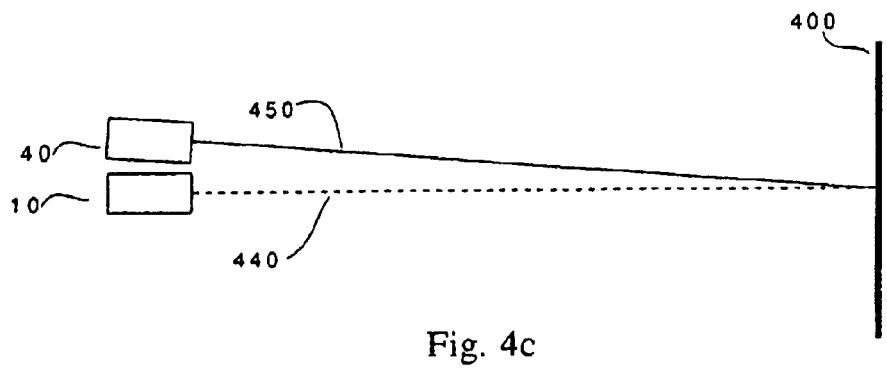
FIG. 4c illustrates vertical and angular displacement of the laser beam with respect to the imaging optics and field of view in accordance with the present invention.

The scan line is preferably centered vertically on field of view 400 as shown in FIG. 4*a*. In order to maintain the correct relation of the scan line to the field of view of the 2D imager it is desirable to have the scan line emanate from a point very close to the optical axis of the 2D imager. FIG. 4*b* is a side view illustrating the position of laser scan module 40 in relation to imaging module 10. Laser scan module 40 is directly above 2D optical axis 440 and laser beam 450 is horizontally aligned and centered in field of view 400. A certain amount of parallax is unavoidable since it is impractical to also vertically align and center the laser scan beam. One way to overcome this issue is to have the laser parallel to and slightly above the center of the optical axis as shown in FIG. 4*b*. In this case laser beam 450 is always slightly above optical axis 440 by a distance V. As long is distance V is relatively small, the operator will be able to center bar codes with adequate precision. Alternatively, the laser scan line can be aimed slightly downward to place scan beam 450 closer to vertically centered with optical axis 440 as shown in FIG. 4*c*. However, the vertical position of scan line 410 in the field of view changes as the range to bar code changes. The vertical position of scan line 410 lowers as the range gets longer.

Triggering

In addition to the operating modes described above, the reader can also include a multiple position trigger 60 for separately enabling the laser scanner and the 2D image capture and processing. For example, in a reader with a two position trigger the reader may operate as follows.

When the trigger is pulled to the first position, a bar code read is initiated. The laser scan module 40 is activated at step 310 producing a laser scan line limited to the width of field of view 400. In this mode, the laser scan line is used primarily by the operator as a spotter beam for aiming the reader. However, the scan line is also used to attempt to read bar codes.

When the operator is satisfied with the aim of the reader, the operator may then pull the trigger to the second position, causing the reader to shut off the laser and capture and process a 2D image. If a decode was successful, the reader outputs the result and turns off. If the decode was unsuccessful and the trigger was still in the second position, the reader may go into any of the modes described above (alternating, known, etc.).

The reader may also control the laser scan width as a function of trigger position and operating mode. For example, if the trigger is in a first position, the reader may operate in alternating mode with the laser scan width limited to the width of the field of view. If the trigger is pulled and held to a second position, the reader may operate as a traditional laser scanner, with the full laser scan width and no 2D imaging.

Any combination of multiple position triggers and modes used in conjunction with a bar code reader comprising both a laser scanning module and a 2D image capture and processing ability are to be considered within the scope of the present invention.

Illumination Uniformity

In order to capture the most accurate image of the label being read, the illumination must be sufficiently uniform over the entire imaged area. There can be slow, gradual variations in illumination intensity over the entire area. The absolute level of variation tolerable is a function of the label reflectivity and contrast, and the robustness of the processing algorithms. Sharp, or jagged variations in light intensity over the imaged area are generally not acceptable.

There are many methods of providing uniform illumination for a label at a given distance to the reader. However, the problem becomes more difficult when the reader is operated at varying ranges from the desired label. Additionally, illumination intensity as a function of varying range must be considered along with uniformity.

Multiple Clusters of LEDs

Figure 5:
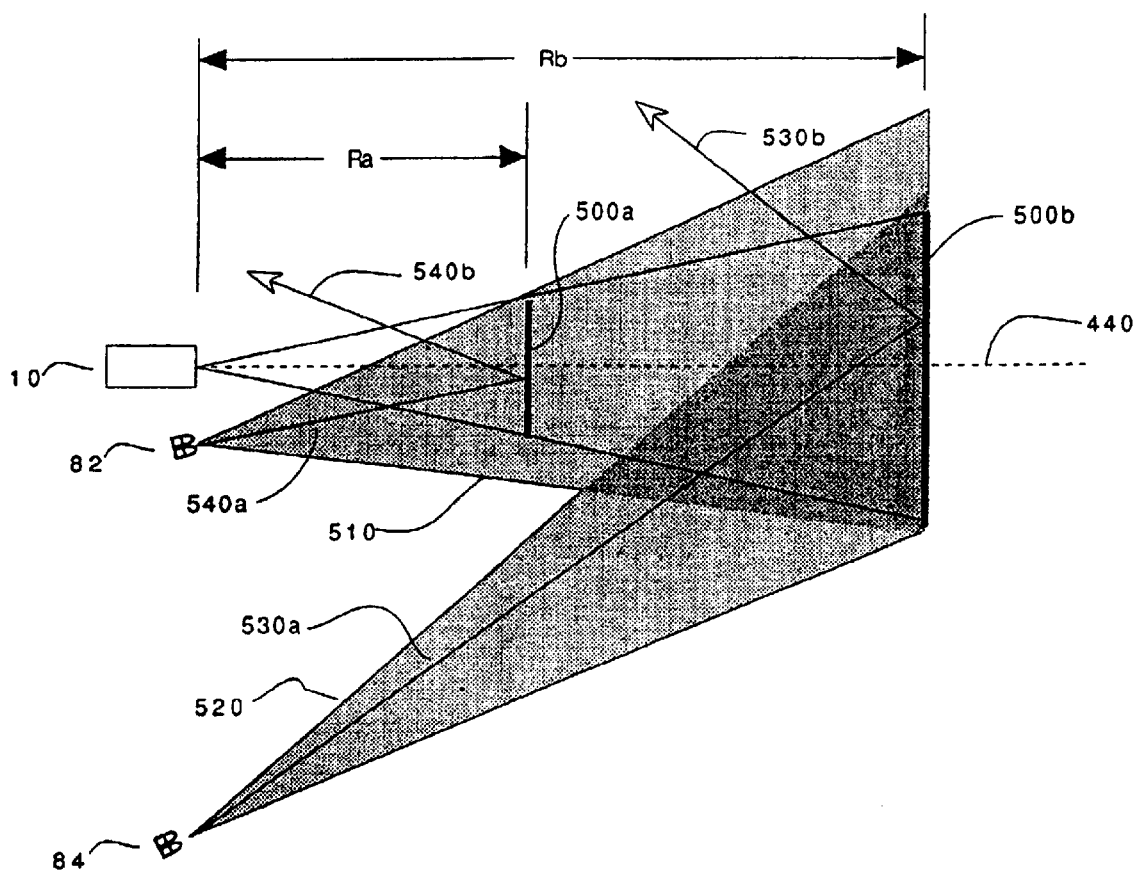
FIG. 5 illustrates an arrangement of illumination for imaging in accordance with the present invention

FIG. 1 and FIG. 5 show an arrangement that can be used to provide uniform illumination at different distances by having multiple clusters of LEDs. Each of the clusters are designed to provide uniform light and intensity at varying ranges. LED cluster 82 is used at close range, shown as distance Ra. The LEDs in cluster 82 should illuminate in a wide angle pattern 510 to cover area 500a. Cluster 84 is used at longer range Rb to illuminate area 500b. The LEDs in cluster 84 should illuminate smaller angle pattern 520 to eliminate wasted light (i.e., light that does not fall within the field of view). At intermediate ranges the illumination will be provided by both clusters. In general, LED clusters may be used in combination to provide uniform illumination over all ranges. LEDs within a cluster may be pointed in the same way, or be individually aimed to provide the best coverage. In all of the various arrangements, the type of LED (focal length/angle of radiation, intensity) must be chosen to provide the proper overlaps and uniformity. Additionally, the LEDs can be connected in a fashion that provides tolerance to defective or failed LEDs (example: wired in parallel).

The LED clusters can be controlled individually or used all together. In the simplest case, all clusters are flashed together. If the reader has the ability to detect range, only the clusters which will provide the best illumination should be used. Additionally, the clusters may have individually controllable output power and duration. Finally, the number and position of clusters, along with the choice of LEDs (angle, power, arrangement) must be chosen to best suit the desired range and coverage width of the reader.

Specular Reflection Reduction

Specular reflection occurs when an illumination source is reflected in a non-diffuse manner off of a glossy surface onto the imager (i.e. the bar code label acts like a mirror). The result is an overly bright spot which saturates the imager. There are generally three types of bar codes which experience specular reflection problems: bar code labels with a clear glossy coating, bar code labels printed with glossy ink, and bar codes that are behind glossy wrapping (such as poly bags, etc.). In normal operation, bar code readers rely on white ( the spaces) reflecting more light than the black (the bars). Any specular reflections reflect more light than either the white or the black, and can render a bar code unreadable unless the specular reflections are eliminated and/or reduced in size. Prior art readers have used cross polarization to effectively eliminate specular reflections. However, cross polarizing increases the light energy required by a factor of 6 or more (which dramatically increases electrical energy required, and the number and size of light sources). Additionally, a reader using cross polarization can not take advantage of ambient light for illumination.

It is desirable to reduce to both number and size of light sources, and to position them in a way that sends specular reflections off in harmless directions (i.e. not seen by the imager). Each cluster of LEDs as shown in FIGS. 1 and 5 act as if they are effectively one point source, giving the reader only 2 effective sources of specular reflections. If a specular reflection is received due to a cluster, only a small portion of the image is therefore rendered unusable.

In the current invention, the illumination sources are positioned in a way that sends specular reflections off in harmless directions. The direction of specular reflection is illustrated by light ray 530a generated by cluster 84. If a specularly reflective label is present where this ray intercepts the label at 500b, the reflected ray 530b is not seen by the imager, and likewise with light ray 540a generated by cluster 82. If a specularly reflective label is present where this ray intercepts the label at 500a, the reflected ray 540b is not seen by the imager.

There are many combinations of light sources in accordance with the current invention that will be effective at varying ranges to provide uniformity constant absolute illumination, and specular reflection reduction.

Power Control/Supply

The illumination requires a relatively large amount of energy delivered in a short time, exceeding the current delivery capabilities of many host computers (i.e. portable, battery operated). Therefore, the reader may include a means to control and power the illumination, shown as LED power module 86 in FIG. 2. The power module is used to provide the energy instantaneously needed by the reader for illumination by using an energy storage device, preferably with low effective series resistance (such as a capacitor), that is charged during the intervals between LED flashes. In readers requiring very intense illumination, the storage device can be a rechargeable battery (i.e. NiCad).

Autofocus

Auto focus can be used to greatly increase the usable range of the 2D reader. Additionally, the use of autofocus allows imaging optics with a smaller f number, which allows capturing images using less LED or ambient light and/or using shorter exposure times to reduce motion blur.

Range Determination/Optional Range Measuring Using Laser Scan

The range from the reader to the label is preferably measured to allow the correct setting of the focus of the imaging optics 12 (FIG. 1). The reader may determine the distance by using the laser scanner in conjunction with a position sensing device (PSD) such as one made by Hamamatsu shown as 90 in FIG. 1. Using the laser scanner to determine range combines the functions of laser scanning for bar code reading and range finding for 2D focus setting for 2D reading. The dual use of the laser eliminates the need for separate systems to determine distance (such as ultrasonic, or dedicated electro-optical components). Position sensing device PSD 90 can also function as laser collection sensor 49, used to capture the return signal of the laser for bar code reading. The use of a band pass optical filter (matched to the laser wave length) may be used to reduce undesired ambient light.

Figure 6:
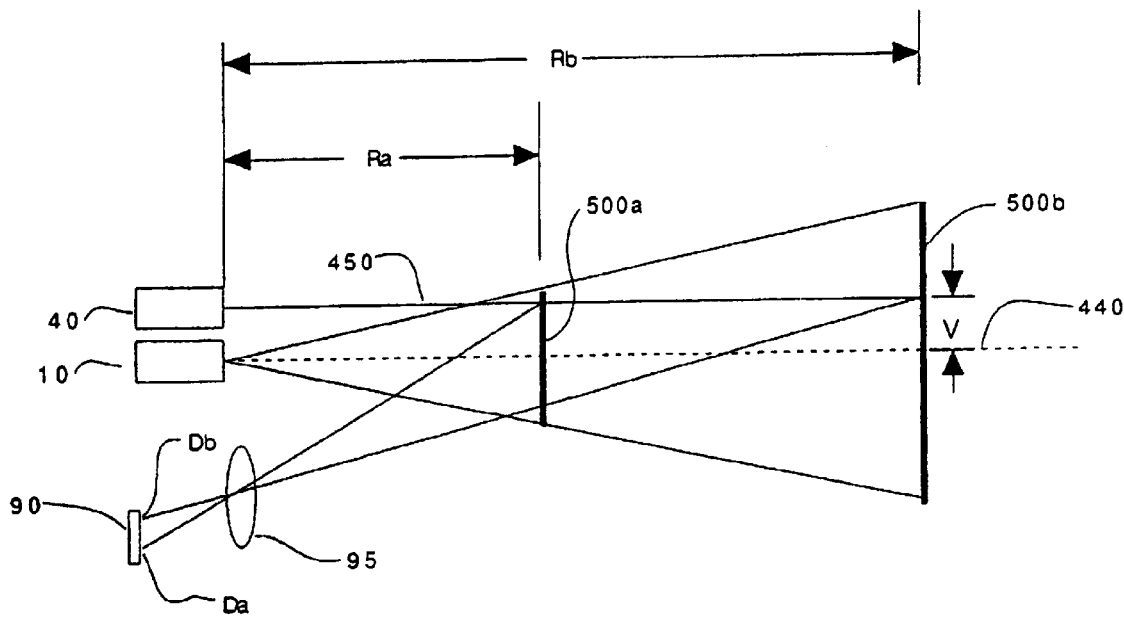
FIG. 6 illustrates an arrangement of a position sensing device for determining range in accordance with the present invention.

The preferred embodiment for using the laser scanner to measure range is shown in FIG. 6. Laser scan module 40 is positioned in a manner that scans beam 450 horizontally. PSD 90 is positioned below the laser in a vertical orientation. Lens 95 focuses the reflected laser beam onto PSD 90. The vertical displacement of reflected laser beam 450 on PSD 90 is proportional to the range from the reader to the target. As the range becomes greater, the reflected laser beam moves closer to the top of the PSD 90. The distance is calculated by simple geometry (similar triangles). If the label is at range Ra, the reflected position of laser beam 450 is at displacement Da. If the label is at the greater range Rb the reflected position of laser beam 450 moves closer to the top of PSD 90 shown as displacement Db.

In a similar fashion, the reader can also determine the range by capturing an image of the laser scan on the 2D imager, and then calculating the distance to the bar code by the position of the image of the beam on the image sensor instead of a PSD. The laser must be scanned parallel to and offset from the an optical axis of the 2D imaging axis.

In a reader embodiment with autofocus, the reader first scans the bar code with the laser used to aim, attempts to read the bar code, and to determine the range. If the laser did not read the bar code, the reader then adjusts the 2D imaging optics based on the determined range, and then captures and processes the image of the bar code. This may be repeated in an iterative fashion until the bar code is read.

Additionally, it is also possible to use an autofocusing lens on the laser scanner to increase laser scanning range. The laser/PSD combination can be used to determine the correct setting for the laser lens (the PSD range finding,described above works even if the laser is not well focused).

The bar code reader could also prevent images from being captured if the range was not appropriate (i.e. too close or too far). This can apply to a reader with fixed or variable focus optics. Various warnings can also be given to the operator to alert of these conditions including flashing lights, lights of different colors, modulating the laser (dashed pattern, flashing, etc.), or audible warnings. The reader can also operate in a mode where the reader auto-triggers when in range.

While it is appreciated that there are many ways to determine range to an object, the present invention determines the range adding any minimal additional components. Additionally, the reader may be calibrated during manufacture by positioning targets at known distances from the reader.

Auto Trigger—Presentation Scanner

In a presentation type application, the reader can operate in a mode where the reader auto-triggers the image capture when a bar code is present. The laser scanner, if operated continuously (or repeatedly scans after a predetermined time interval) can detect a bar code's presence by sensing change in the returned signal from a known (or previously captured) background. If the laser scanner detects a change and cannot decode the returned laser signal, an image is then captured and processed. Presentation readers are typically hand held scanners that are mounted in a way that allows reading without the operator holding the reader. Presentation readers also include fixed mount readers (i.e. not hand held) such as retail point of sale readers. Presentation readers include any reader where the operator moves the item with a bar code into the field of view of the scanner.

Any bar code reader, including hand held or fixed mount, that comprises both a laser scanning module and a 2D image capture and processing ability are to be considered within the scope of the present invention.

Exposure Control

It is desirable to control the exposure of the image captured. The exposure can be set based on factors including range, area covered, ambient light, and surface reflectivity. The preferred method for controlling the exposure is to control the duration and power of the illumination along with the exposure time of the CCD. The method of determining range described above can be used as an input to the correct exposure.

Image Capture

A suitable image sensor for use with the present invention is a progressive scan CCD such as the Sony KX084. A progressive scan imager captures an entire frame in one exposure. It also has an electronic shutter which can stop the charge from integrating at any arbitrary time without the need for a mechanical shutter. The sensitivity of these CCDs combined with the level of ambient light available can, in many environments, reduce the need for additional illumination. Additionally, the brighter the ambient conditions, the shorter the exposure time, reducing hand jitter. However, there are still many environments (night, dark warehouses, etc.) that require additional light.

The reader may "pre-capture" an image of the area likely to contain a bar code without using illumination (or reduced LED illumination) in order to determine the ambient light and label reflectivity. Analysis of the captured image allows the proper setting of illumination duration and CCD exposure time. This pre-capture may occur during the laser scan time, as long as the reader has knowledge of where the reflected scan line can appear on the imager. Alternatively, the laser can be shut off during the "pre-capture" exposure.

Laser Beam For Range/Exposure

The laser can be used as the illumination source for surface reflectivity determination as well as range determination. The light sensor (49 or 90) and signal processing used to capture the reflected laser scan must have the ability to detect variable levels of light returned. Light level sensing is preferably implemented using an A/D converter connected to the light sensor. The benefits of using the laser for surface reflectivity determination include lower power consumption since the main illumination sources do not have to be flashed, and a savings in processing and imager readout time, since with one scan of the laser, both the range and the surface reflectivity can be determined simultaneously.

Alternatively, the 2D CCD can be used to image the area illuminated by the laser scan provided that the CCD exposure and the laser scan occur simultaneously. The image read out of the CCD will then contain surface reflectivity levels of the area of the bar code where the laser scanned, along with information about the ambient light levels on the scene were the laser was not scanning.

Quiescent/Wakeup Power Control

The present invention preferably includes a means to minimize power consumption (i.e. quiescent current draw) during the time the reader is not being used. Minimizing quiescent power is achieved by putting the reader in a sleep state and is especially useful for battery powered applications. Additionally, the reader must also be able to "wake-up" from the sleep state as fast as possible in response to a trigger. There are usually tradeoffs in how deep a sleep the reader can be in and how fast it can wake-up versus the power consumption while sleeping.

There are a variety of ways to minimize quiescent current draw. Most modern processors have varying sleep states where portions of the processor are turned off and/or clock speeds are reduced to conserve quiescent power. Additionally, certain components can be turned off including the CCD, and power supplies.

Factors that contribute to the time it takes the reader to "wake-up" from a quiescent state includes the time for the processor to come out of a sleep state and stabilize, the time for voltages needed for reader to stabilize, the time for the CCD to turn on, and the time to load the program from ROM to RAM. If the program is maintained in RAM (using low current draw self-refreshing DRAMs or SRAM) the time to load the program is eliminated. Additionally, the reader can operate in a manner which enables certain features such as the laser to be energized for aiming while the processor and other circuitry are waking up.

What is claimed is:

1. A reader for reading a bar code symbol and the like, said reader having a two dimensional image capture module for capturing two dimensional images, said image capture module having a field of view defining an imaged area, and a processor for processing said images, said reader comprising:
    (a) a two dimensional image sensor;
    (b) memory;
    (c) a microprocessor;
    (d) a laser scan line generator for generating a variable width laser scan line, wherein said scan line is at least partially contained within said field of view of said image capture module;
    (e) wherein said scan line provides a visible indication of the field of view;
    (f) a collection sensor which produces an electrical signal in response to reflected light from said laser scan line; and
    (g) signal processing circuitry for processing said electrical signal, wherein the processed electrical signal is further processed by said microprocessor,
    (h) wherein said laser scan line is turned off during image capture of images used to decode bar code symbols.

2. A reader in accordance with claim 1, wherein said two dimensional image capture module has an optical axis, and said laser scan line emanates proximate the axis.

3. A reader in accordance with claim 1, wherein the laser scan line is offset from said optical axis, and said laser scan line is slightly angled towards said optical axis to compensate for parallax errors introduced by said offset.

4. A reader in accordance with claim 1, wherein said a laser scan line generator is comprised of; (a) a resonant scanner; and (b) a laser power control for modulating the laser on and off.

5. A reader in accordance with claim 1, wherein said laser scan line generator is comprised of a controllable position mirror.

6. A reader in accordance with claim 1, wherein the scan line is wider than the field of view, whereby bar codes wider than said field of view can be decoded.

7. A reader in accordance with claim 1, wherein the scan line is substantially narrower than the field of view, whereby a visible indication of the center of the field of view is provided.

8. A reader in accordance with claim 1, wherein the scan line is collapsed to substantially a point, whereby a visible indication of the center of the field of view is provided.

9. A reader in accordance with claim 1, wherein the width of the scan line is measured by
    (a) turning on said laser scan line;
    (b) capturing an image with said two dimensional image capture module; and
    (c) processing said image with said microprocessor to determine the width of said scan line.

10. A reader in accordance with claim 1, further comprises a program executed on said microprocessor for automatically adjusting the width of the laser scan line.

11. A reader in accordance with claim 1, further comprises operator selectable laser scan line widths.

12. A reader in accordance with claim 1, wherein the range from said symbol to said reader is determined in response to the reflected laser scan line.

13. A reader in accordance with claim 12, further comprising variable imaging optics; wherein the focus of said variable imaging optics is set responsive to said range.

14. A reader in accordance with claim 12, further comprising illumination having variable power; wherein the power of said variable power optics is set responsive to said range.

15. A reader in accordance with claim 12, further comprising illumination having variable duration; wherein the duration of said variable duration illumination is set responsive to said range.

16. A reader in accordance with claim 12, wherein the two dimensional image sensor's exposure time is set responsive to said range.

17. A reader in accordance with claim 12, wherein the image capture is disabled if said range is less than a predetermined near range or greater than a predetermined far range.

18. A reader in accordance with claim 12, further comprising variable focus laser optics; wherein the focus of said variable focus laser optics is set responsive to said range.

19. A reader in accordance with claim 12, wherein said range is determined by
    (a) turning on said laser scan line;
    (b) capturing an image with said two dimensional image capture module; and
    (c) processing said image with said microprocessor to determine the position of said scan line on said image sensor.

20. A reader in accordance with claim 19, wherein only the lines of interest are read out of said image sensor and processed by said microprocessor.

21. A reader in accordance with claim 1, wherein the surface reflectivity of said symbol is determined in response to the reflected laser scan line.

22. A reader in accordance with claim 21, further comprising illumination having variable power; wherein the power of said variable power optics is set responsive to said surface reflectivity.

23. A reader in accordance with claim 21, further comprising illumination having variable duration; wherein the duration of said variable duration illumination is set responsive to said surface reflectivity.

24. A reader in accordance with claim 21, wherein the two dimensional image sensor's exposure time is set responsive to said surface reflectivity.

25. A reader in accordance with claim 21, wherein said surface reflectivity is determined by (a) turning on said laser scan line;

(b) capturing an image with said two dimensional image capture module; and (c) processing said image with said microprocessor.

26. A reader in accordance with claim 25, wherein only the lines of interest are read out of said image sensor and processed by said microprocessor.

27. A reader in accordance with claim 1, further comprises a program executed on said microprocessor for sequencing the generation of the laser scan lines and capturing images with said two dimensional image capture module.

28. A reader in accordance with claim 27, wherein said sequencing alternates between the generation of the laser scan lines and capturing images with said two dimensional image capture module.

29. A reader in accordance with claim 27, wherein said sequencing automatically adjusts responsive to a previously decoded symbol.

30. A reader in accordance with claim 27, wherein said sequencing is controlled by an operator of the reader.

31. A reader in accordance with claim 1, further comprising a multiple position trigger, wherein said trigger has a first and a second position.

32. A reader in accordance with claim 29, wherein said laser scan line generator generates a laser scan line responsive to said first position of said trigger.

33. A reader in accordance with claim 29, wherein said image capture module captures an image responsive to said second position of said trigger.

34. A reader in accordance with claim 1, wherein the range from said symbol to said reader is determined in response to the reflected laser scan line; and wherein said collection sensor is a position sensing device.

35. A reader in accordance with claim 1, wherein said image capture module is triggered responsive to changes in said electrical signal, wherein said changes are caused by a reflection of said laser scan line from an object.

36. A reader in accordance with claim 1, further comprising a program executed on said microprocessor for symbol decoding, wherein said electrical signal is processed by said microprocessor to decode a symbol.

37. A reader in accordance with claim 1, further comprising a program executed on said microprocessor for determining symbol information from said electrical, whereby said symbol information is provided to said processor for processing said images.

38. A reader in accordance with claim 1, further comprising a program executed on said microprocessor for processing said electrical signal by said microprocessor in gray scale.

39. A reader in accordance with claim 1, wherein said electrical signal is stored in said memory.

40. A reader in accordance with claim 1, further comprises an A/D converter for digitizing the image sensor's output.

41. A reader in accordance with claim 40, wherein said electrical signal is digitized by said A/D converter.

* * * * *